(12) United States Patent
Sung et al.

(10) Patent No.: US 10,139,781 B2
(45) Date of Patent: Nov. 27, 2018

(54) APPARATUS AND METHOD FOR DISPLAYING HOLOGRAPHIC 3D IMAGE

(71) Applicant: SAMSUNG ELECTRONICS CO., LTD., Suwon-si (KR)

(72) Inventors: Geeyoung Sung, Daegu (KR); Jungkwuen An, Cheonan-si (KR); Hongseok Lee, Seongnam-si (KR); Sunil Kim, Seoul (KR); Hoon Song, Yongin-si (KR); Chilsung Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 54 days.

(21) Appl. No.: 14/793,901

(22) Filed: Jul. 8, 2015

(65) Prior Publication Data
US 2016/0011565 A1    Jan. 14, 2016

(30) Foreign Application Priority Data
Jul. 8, 2014    (KR) .................... 10-2014-0085362

(51) Int. Cl.
*G03H 1/08*     (2006.01)
*G03H 1/28*     (2006.01)
*G03H 1/22*     (2006.01)

(52) U.S. Cl.
CPC ............. *G03H 1/28* (2013.01); *G03H 1/0808* (2013.01); *G03H 1/2294* (2013.01);
(Continued)

(58) Field of Classification Search
CPC ...... G03H 1/08; G03H 1/0808; G03H 1/0841; G03H 2001/0816; G03H 2001/0825; G03H 2001/0833; G03H 2001/085; G03H 2001/0858; G03H 2210/40; G03H 2210/44; G03H 2210/441; G03H 2210/45; G03H 1/10; G03H 1/12; G03H 1/14; G03H 1/2645; G03H 1/265; G03H 2001/2655; G03H 2001/266; G03H 2001/2665; G03H 2001/267; G03H 2001/2675; G03H 2001/0489; G03H 2210/10; G03H 2210/20; G03H 2210/30; G03H 2225/33;
(Continued)

(56) References Cited

U.S. PATENT DOCUMENTS

| 2004/0184145 A1* | 9/2004 | Fridman ............ G02B 27/2214 359/462 |
| 2010/0103246 A1* | 4/2010 | Schwerdtner ........ G03H 1/2205 348/40 |

(Continued)

FOREIGN PATENT DOCUMENTS

| KR | 10-2009-0011973 A | 2/2009 |
| KR | 10-2012-0010554 A | 2/2012 |
| KR | 10-2014-0013453 A | 2/2014 |

*Primary Examiner* — Jade R Chwasz
(74) *Attorney, Agent, or Firm* — Sughrue Mion, PLLC

(57) ABSTRACT

An apparatus and a method for displaying holographic 3D image are provided. The method includes generating, by a controller, a hologram signal to generate multiple identical hologram images which are shifted with respect to one another by a predetermined distance and overlapped on one another, and modulating, by a spatially light modulator (SLM), light incident on the SLM based on the hologram signal.

21 Claims, 8 Drawing Sheets

(52) U.S. Cl.
CPC ............... *G03H 2001/221* (2013.01); *G03H 2001/2242* (2013.01); *G03H 2210/30* (2013.01); *G03H 2226/05* (2013.01)

(58) Field of Classification Search
CPC ........ G03H 2225/34; G03H 1/24; G03H 1/28; G03H 2001/2263; G03H 2001/2268; G03H 2001/2271; G03H 2001/303; G03H 1/2294; G03H 2001/221; G03H 2001/0224; G03H 2001/2242; G03H 2001/2236; G03H 2226/05; G03H 2001/2284; G03H 1/268; G11C 13/042
USPC ..................................... 359/9, 10, 11, 21, 24
See application file for complete search history.

(56) References Cited

U.S. PATENT DOCUMENTS

| | | |
|---|---|---|
| 2012/0092735 A1 | 4/2012 | Futterer et al. |
| 2013/0208328 A1* | 8/2013 | Chae .................... G03H 1/2202 359/11 |
| 2013/0222873 A1 | 8/2013 | Kwon et al. |
| 2014/0016051 A1* | 1/2014 | Kroll ....................... G03H 1/22 349/15 |
| 2014/0293385 A1* | 10/2014 | Smithwick ............... G03H 1/26 359/9 |

* cited by examiner

APPARATUS AND METHOD FOR DISPLAYING HOLOGRAPHIC 3D IMAGE

CROSS-REFERENCE TO RELATED APPLICATION

This application claims priority from Korean Patent Application No. 10-2014-0085362, filed on Jul. 8, 2014 in the Korean Intellectual Property Office, the disclosure of which is incorporated herein in its entirety by reference.

BACKGROUND

1. Field

Apparatuses and methods consistent with exemplary embodiments relate to displaying a holographic three-dimensional (3D) image.

2. Description of the Related Art

Holographic 3D image display apparatuses provide natural 3D images compared to 3D image display apparatuses using a binocular parallax method.

In parallel with the recent growth of 3D movies, 3D image technologies have been extensively studied. Particularly, considerable attention has been paid to a complex spatial light modulator (SLM) that simultaneously controls an amplitude and phase of light to obtain a real-time high-definition hologram.

However, it is quite difficult to obtain a wide angle holographic image due to a pixel limitation of the SLM. To address this matter, methods for displaying a narrow angle holographic image by using a field lens have been researched.

A viewing window is formed in a specific position based on a pixel length of the SLM, the field lens, and the like. A user is able to see a holographic image through an image window in the viewing window. When the user slightly moves, the user is likely not able to see the holographic image because the image window is as small as a length of a pupil. To address this problem, there is a need for a high precision eye-tracking method.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments provide apparatuses and methods for displaying a holographic 3D image, whereby a pupil field of view may be enlarged.

According to an aspect of an exemplary embodiment, there is provided a method of displaying holographic 3D image, the method including: generating, by a controller, a hologram signal to generate multiple identical hologram images which are shifted with respect to one another by a predetermined distance and overlapped on one another, and modulating, by a spatially light modulator (SLM), light incident on the SLM based on the hologram signal.

The generating the hologram signal may include determining a number of the multiple identical hologram images, and determining the predetermined distance.

The predetermined distance may comprise determining the predetermined value to set a pitch of the multiple identical hologram images to be larger than or equal to a pupil length of a user.

The predetermined distance may comprise photographing the pupil length of the user.

The predetermined distance may be determined based on the pupil length of the user stored in advance and a background illuminance level.

The method may further include controlling an intensity of the incident light based on the number of the multiple identical hologram images.

The number of the multiple identical hologram images may be determined according to a signal input by the user.

The method may include tracking a position change of a pupil of a user.

The method may further include receiving a value of the position change of the pupil, and determining whether or not to regenerate a hologram signal for the multiple hologram images corresponding to the value of the position change of the pupil.

The modulating may include modulating the incident light based on the hologram signal without regenerating the new hologram signal if the value of the position change of the pupil is less than or equal to N×HS, where N is the number of the multiple identical hologram images.

If the value of the position change of the pupil is larger than N×HS, where N is the number of the multiple identical hologram images, and HS is the predetermined distance, the hologram signal for the multiple identical hologram images corresponding to the position change of the pupil may be regenerated, or the light modulated by the SLM may be directed toward a position of the pupil that corresponds to the value of the position change.

According to an aspect of an another exemplary embodiment, there is provided a holographic 3D image display apparatus including: a light source, a spatially light modulator (SLM) configured to modulate light which is transmitted from the light source and incident on the SLM, and a controller configured to generate a hologram signal to generate multiple identical hologram images which are shifted with respect to one another by a predetermined distance and are overlapped on one another, and control the SLM based on the hologram signal.

The display apparatus may further include an image pickup device photographing a pupil of a user.

The display apparatus may further include an illuminance sensor measuring a background illuminance level.

The display may further include an eye tracking unit tracking a position of a pupil of a user.

The display apparatus may further include a beam steering device directing light which is modulated by the SLM and transmitted toward a pupil of a user.

The beam steering device may include an active optical prism or a liquid crystal grating.

The display apparatus may further include an input device receiving from a user a number of the multiple identical hologram images and transmitting the number of the multiple identical hologram images to the controller.

The controller may control an intensity of the light transmitted from the light source based on the number of the multiple identical hologram images.

According to an aspect of another exemplary embodiment, there is provided an image display apparatus including: a controller configured to generate a hologram signal that includes a value of a hologram shift; and a spatially light modulator (SLM) configured to generate, based on the hologram signal, a plurality of hologram patterns including a first hologram pattern placed at a first position and a second hologram pattern placed at a second position spaced, wherein the second position is spaced apart from the first position by the value of the hologram shift and the plurality of hologram patterns represent an identical image, wherein the controller sets the hologram shift to correspond to a pupil length of a user.

BRIEF DESCRIPTION OF THE DRAWINGS

The above and/or other exemplary aspects will be more apparent by describing certain exemplary embodiments, with reference to the accompanying drawings in which.

DETAILED DESCRIPTION

Figure 1:
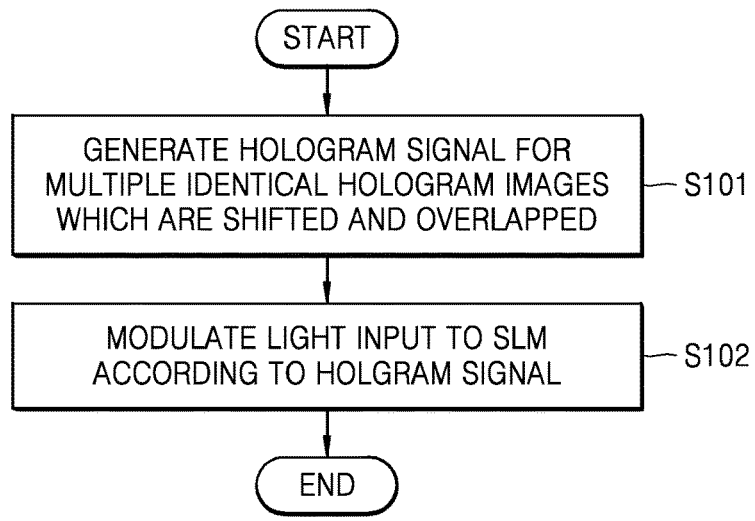
FIG. 1 is a simplified flowchart for explaining a method of displaying a holographic 3D image according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

Figure 2:
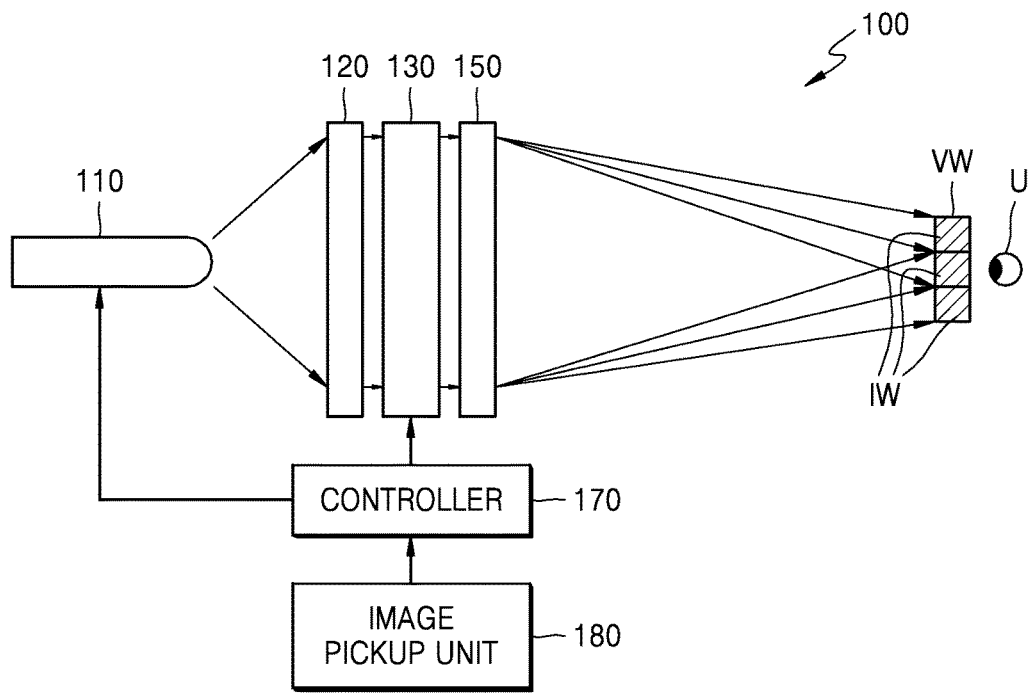
FIG. 2 schematically illustrates a holographic 3D image display apparatus according to an exemplary embodiment.

FIG. 1 is a simplified flowchart for explaining a method of displaying a holographic 3D image according to an exemplary embodiment. FIG. 2 schematically illustrates a holographic 3D image display apparatus according to an exemplary embodiment. The holographic 3D image display apparatus of FIG. 2 uses the method of FIG. 1.

As shown in FIG. 1, a hologram signal is generated to shift multiple identical hologram images with respect to one another by a predetermined distance so that the multiple identical hologram images are partially overlapped one another (S101). In turn, a spatial light modulator (SLM) incident light according to the hologram signal (S102).

The holographic 3D image display apparatus 100 may include a light source 110, a collimator 120, a SLM 130 modulating light input thereto from the light source 110, a field lens 150, and a controller 170 transmitting a control signal for forming a hologram image to the SLM 130.

The controller 170 may generate the hologram signal for multiple identical hologram images which are shifted with respect to one another by a predetermined distance and overlapped on one another.

The SLM 130 may modulate light input thereto from the light source 110 according to the hologram signal from the controller 170. The SLM 130 may include a plurality of pixels and reproduce a 3D image according to the hologram signal by modulating light via amplitude and/or phase modulation when light passes through each pixel of the SLM 130 and reconstituting object points. Each object point denotes a point of the reconstituted 3D image.

According to the method of FIG. 1 and the apparatus of FIG. 2, a plurality of image windows IWs are provided in a viewing window VW. The plurality of image windows IWs provide a same image. The viewing window VW means a field of view where the hologram image is formed so that the hologram image is perceived at a pupil position of the user. The image window IW means an area where the image is actually formed in the VW, occupies a portion of the viewing window VW, and has a length similar to a pupil length of the user. The hologram signal formed by the controller 170 is for multiple identical hologram images which are shifted by a predetermined distance and overlapped. Therefore, a 3D image reconstituted by the SLM 130 is perceived through the viewing window VW including a plurality of image windows IWs.

Figure 5:
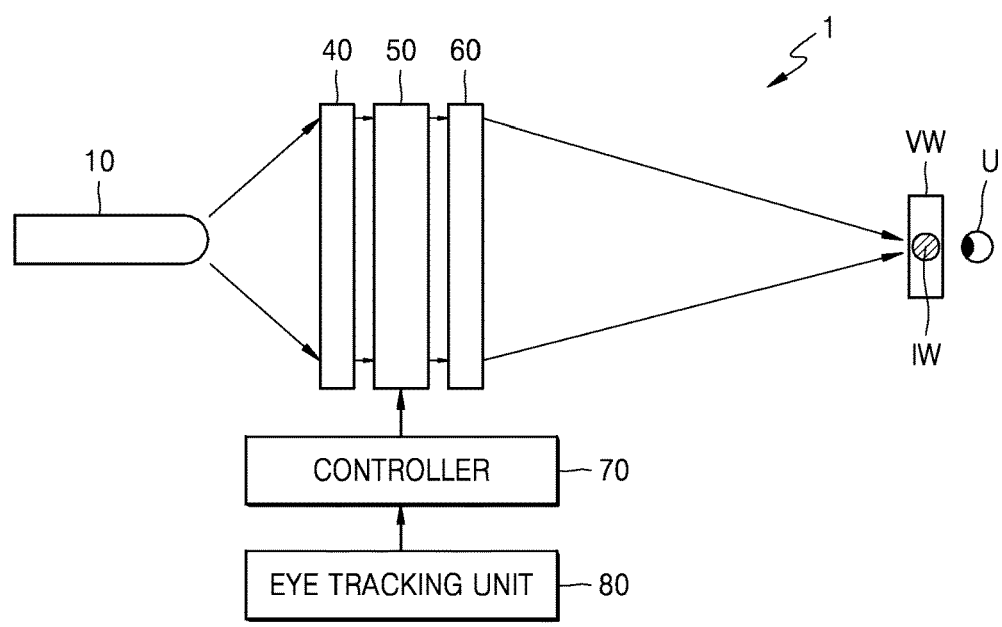
FIG. 5 schematically illustrates a holographic 3D image display apparatus according to a comparison example.

FIG. 5 schematically illustrates a holographic 3D image display apparatus according to a comparison example.

The holographic 3D image display apparatus 1 may include a light source 10, a collimating lens 40, a spatial light modulator (SLM) 50, and a field lens 60. The holographic 3D image display apparatus 1 may further include a controller 70 that controls the SLM 50 to modulate light incident from the collimating lens 40 onto the SLM 50.

An image window IW occupies a portion of an area of a viewing window VW which is formed by the holographic 3D image display apparatus 1. Thus, when a pupil position of a user deviates from the image window IW due to a movement of the user, a hologram image may be not perceived by the user.

The holographic 3D image display apparatus 1 may further include an eye tracking unit 80. The eye tracking unit 80 may include a camera photographing the pupils of the user. Also, the eye tracking unit 80 may store eye tracking software. If it is determined to change a position of the view window VW according to information sensed by the eye tracking unit 80, the hologram may be perceived at a changed pupil position of the user. Since a length of the image window IW is as small as a pupil length, for example, 3 mm~8 mm, it is required that the camera in the eye tracking unit 80 has high precision and the eye tracking software operates at high driving speed.

Figure 3:
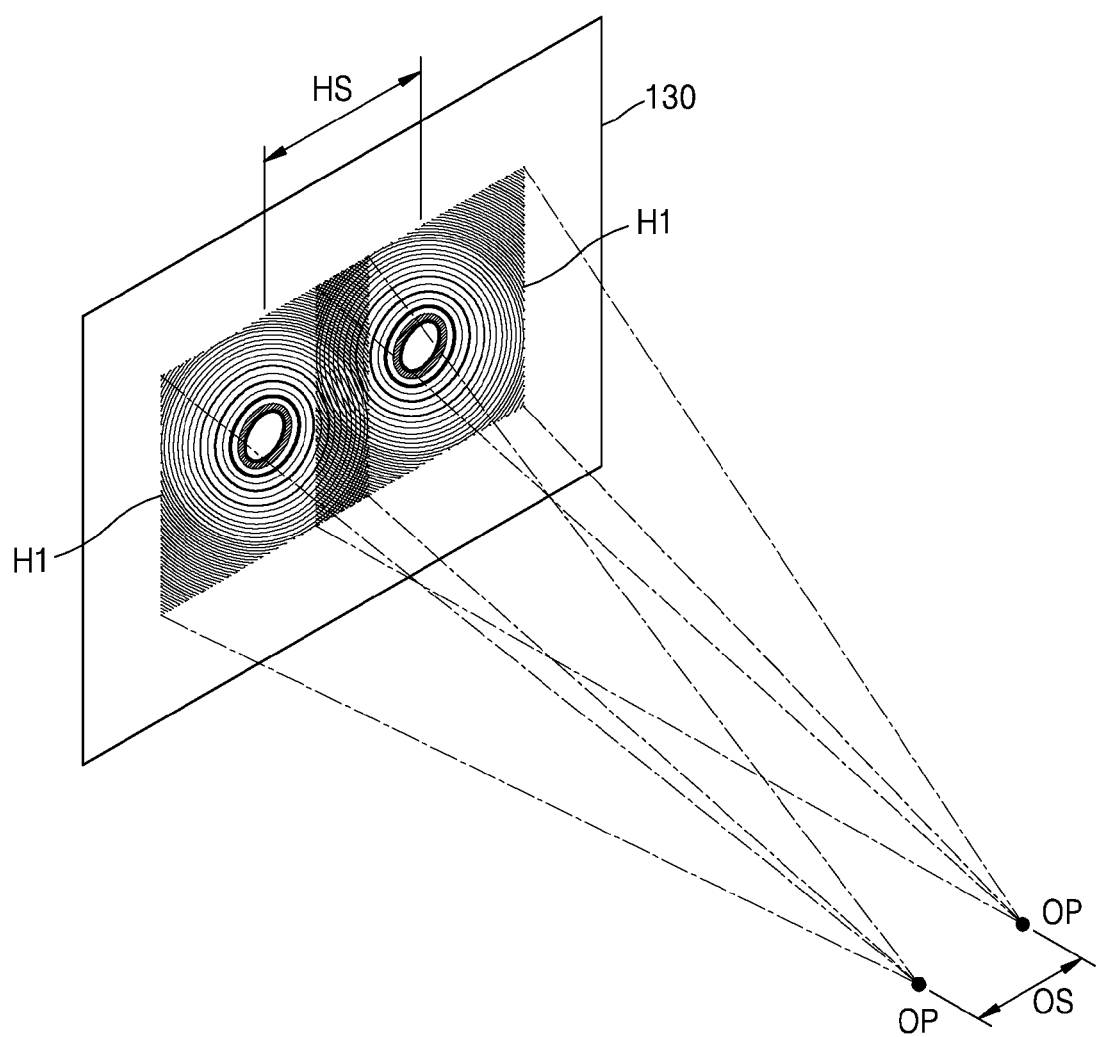
FIGS. 3 and 4 are conceptual diagrams explaining multiple hologram images which are adopted in a holographic 3D image display apparatus according to an exemplary embodiment.
Figure 4:
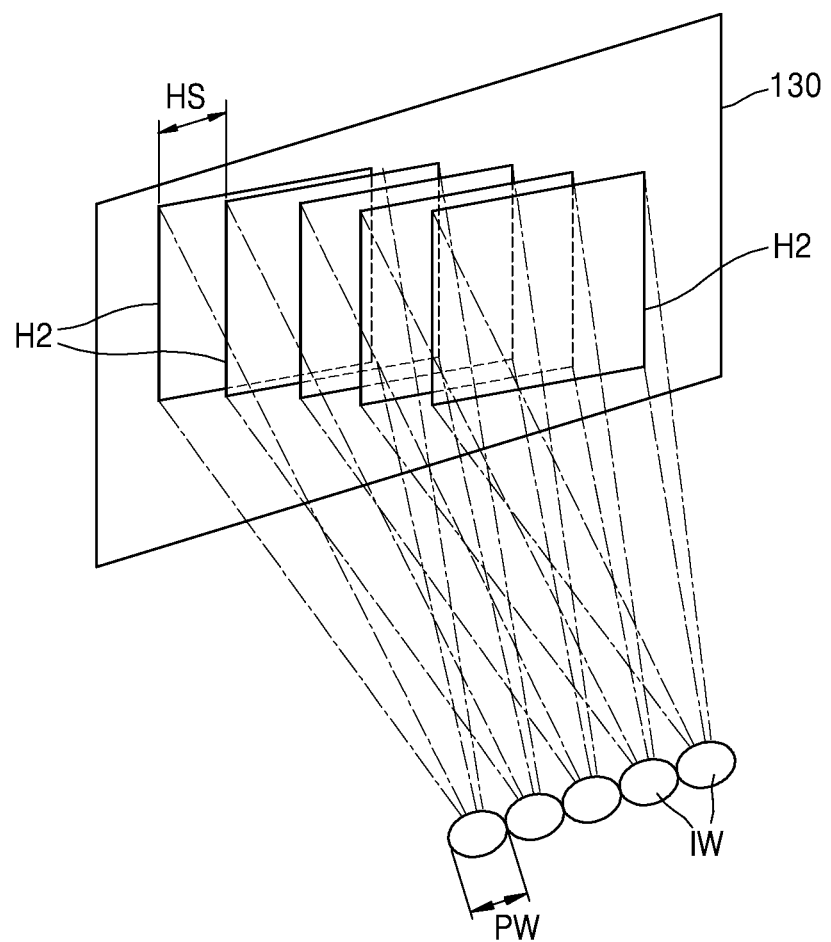

FIGS. 3 and 4 are conceptual diagrams illustrating multiple identical hologram images which are displayed by a holographic 3D image display apparatus according to an exemplary embodiment.

As shown in FIG. 3, two identical hologram patterns H1 are spaced apart by a predetermined distance on the SLM 130. Each pattern H1 is exemplified to form one object point OP. A 3D image is formed by a combination of the object points OPs. A hologram shift (HS) that appears on the SLM 130 represents an object shift OS between object points OPs to be reproduced on a space.

FIG. 4 shows a plurality of hologram patterns H2 to be reproduced as a predetermined image. The hologram patterns H2 are spaced from one another on the SLM 130 by a predetermined distance and overlapped on one another. The predetermined distance may be referred to as a hologram shift HS. The hologram patterns H2 represent the same 3D image. In FIG. 3, the hologram pattern H1 is reconstituted as the object point OP. In contrast, the 3D image reconstituted by the hologram patterns H2 occupies a predetermined space. Since a length of the image window IW is close to the pupil length or width PW, if the hologram shift HS is adjusted to render a distance between the reconstituted 3D images to become approximately the same as a pupil length or width PW of a user, continuous image windows IWs are formed in a viewing window VW without a gap between the image windows IWs. If the hologram shift HS is set as a reference value, and further adjusted to be larger than the reference value, the image windows IWs are slightly spaced apart from one another. On the other hand, if the hologram shift HS is further adjusted to be smaller than the reference value, the image windows IWs slightly overlap.

As shown in FIG. 4, although the pupil position of the user is changed in an area where the same image windows IWs are continuously formed, the user may perceive the hologram image without the display apparatus adjusting a position of the image by eye tracking.

A configuration and an operation of the holographic 3D image display apparatus will be explained in detail below with reference to FIGS. 1 and 2.

According to an exemplary embodiment, the light source 110 may include a laser, a light emitting device (LED), or a laser diode (LD). However, the exemplary embodiment is not limited thereto.

The collimator 120 may include at least one lens that aligns light beams incident from the light source 110 in a specific direction. The collimator 120 may include a cylinder lens or a cylinder lens array.

The SLM 130 is a device for spatial light modulation. The SLM 130 controls an intensity, a color, and/or a phase of input light, and may include a controllable matrix having a plurality of pixels. The pixels may reconstitute the object points by modulating an amplitude and/or a phase of light passing through the SLM 130. The SLM 130 may be of a transmission type or a reflection type. It is assumed that the SLM 130 shown in FIG. 1 is of a transmission type. However, the exemplary embodiment is not limited thereto. An exemplary transmission type SLM includes liquid crystal cells or electrowetting cells arrayed on a transparent substrate. An exemplary reflection type SLM includes a liquid crystal on silicon (LCOS) device.

The SLM 130 forms an interference pattern according to a hologram signal generated by the controller 170. Light which excites electrons of the interference pattern propagates to the user's eye and reconstitutes a 3D image.

The field lens 150 may be a condensing lens which condenses light incident from the SLM 130 and transmits the condensed light toward the viewing window VW. For example, the field lens 150 may be a diffractive optical element or a holographic optical element which records a curvature of a predetermined convex or concave lens on a plane.

In FIG. 2, the collimator 120 is disposed in front of the SLM 130, and the field lens 150 is disposed behind of the SLM 130. However, the exemplary embodiment is not limited thereto, and an arrangement order thereof may be changed.

An image pickup unit 180 may photograph a pupil of a user U and generate an image including the pupil. The image pickup unit 180 may determine a length and a position of the pupil based on the image, and transmit information of the length and position of the pupil to the controller 170. Alternatively, the controller 170 may determine the length and position of the pupil based on the image transmitted from the image pickup unit 180.

The controller 170 generates a hologram signal for multiple identical 3D hologram images which are shifted with respect to one another by a predetermined distance, and are overlapped on one another. The hologram signal may be a computer generated hologram. As a method for generating the computer generated hologram, a method using ray tracing, a method using a look-up table, or a method using a high speed Fourier transform may be used.

The controller 170 may generate the hologram signal based on the pupil length and position. For example, the controller 170 determines a shift distance between the multiple identical holograms, that is, a hologram shift, based on the pupil length of the user. The hologram shift may be determined so that the distance between the reconstituted 3D images is as same as the pupil length. Alternatively, the hologram shift may correspond to a reference value, and the distance between the reconstituted 3D images may be slightly larger than the reference value. However, when the hologram shift is smaller than the reference value, the hologram images may be overlapped at the pupil position of the user.

The controller 170 may calculate a hologram value and a position of the multiple holograms on a surface of the SLM 130 based on depth information of the object points constituting a 3D image, position information of the user, a number of holograms to be overlapped, and a predetermined hologram shift.

The controller 170 controls the SLM 130 according to the generated multiple hologram signals.

As the number of the multiple identical hologram images to be overlapped increases, a brightness of a respective image may be reduced. The controller 170 may maintain the brightness of the respective image constant by adjusting an intensity of light emitted by the light source 110 according to the number of the multiple identical hologram images.

An area where the reconstituted 3D image is perceived is referred to as a viewing window VW. Since the holograms displayed on the SLM 130 are multiple holograms which display the same 3D image, are shifted by a predetermined distance with respect to one another, and are overlapped on one another, a plurality of image windows IWs displaying the same 3D image are formed in the viewing window VW without activating multiple light sources differently.

Figure 6:
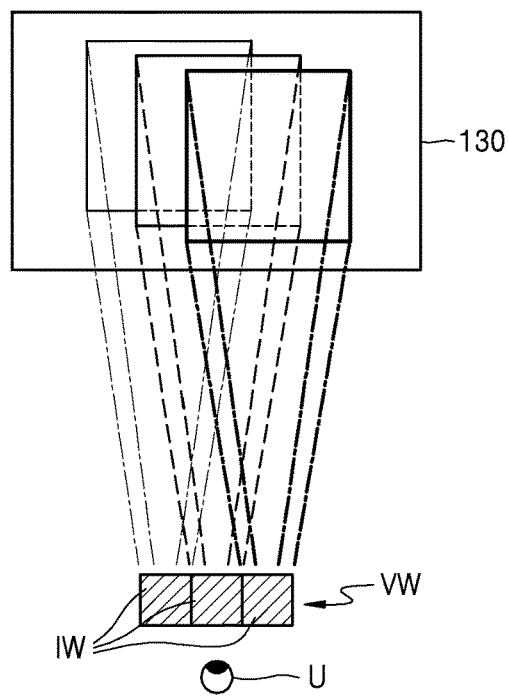
FIG. 6 illustrates a plurality of image windows formed in a viewing window when an apparatus and a method for displaying a holographic 3D image according to an exemplary embodiment are used.

FIG. 6 illustrates a plurality of image windows IWs formed in a viewing window VW when an apparatus and a method for displaying a holographic 3D image according to an exemplary embodiment are used.

In FIG. 6, three image windows IWs are formed in the viewing window VW without any gap therebetween. However, the exemplary embodiment is not limited thereto, and the image windows IWs may be formed with a gap therebetween. In an area where the image windows IWs are repeatedly formed, although the pupil position of the user U changes, the hologram image may be perceived by the user without any abnormality.

Figure 7:
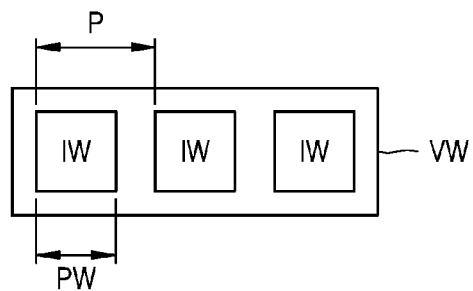
FIG. 7 illustrates a plurality of image windows in a viewing window according to an exemplary embodiment.

FIG. 7 illustrates a plurality of image windows IWs in a viewing window VW according to an exemplary embodiment.

A plurality of image windows IWs are formed in a viewing window VW, and a pitch P between the plurality of image windows IWs is slightly larger than a pupil length or width PW. That is, a gap exists between the plurality of image windows IWs.

Figure 8A:
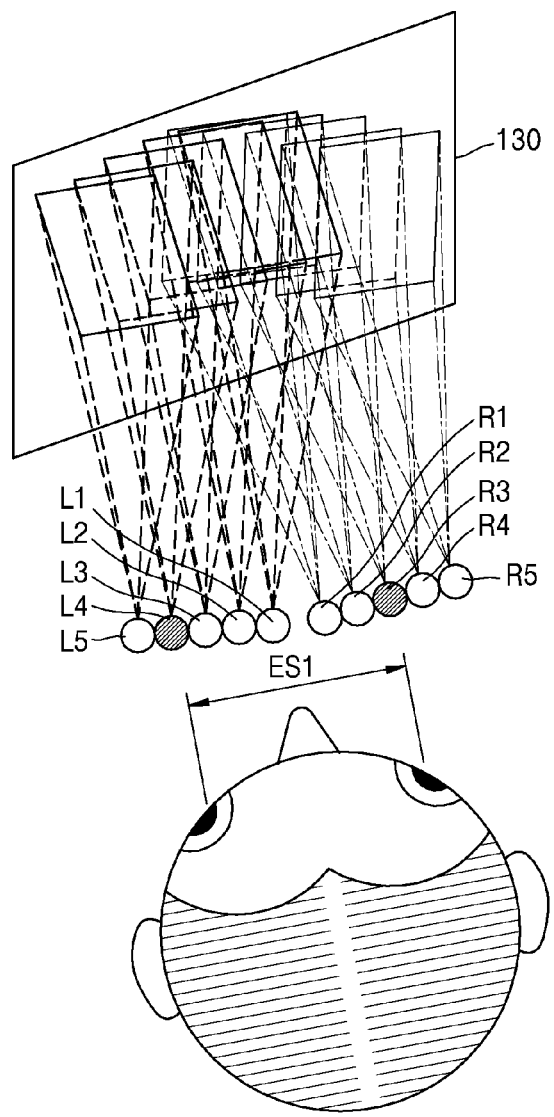
FIGS. 8A, 8B and 8C are conceptual diagrams illustrating a holographic image being perceived in spite of different binocular distances of the users.
Figure 8B:
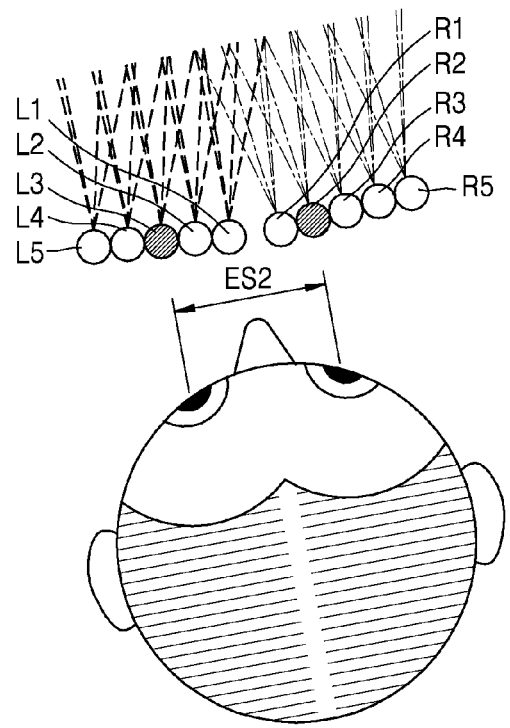
Figure 8C:
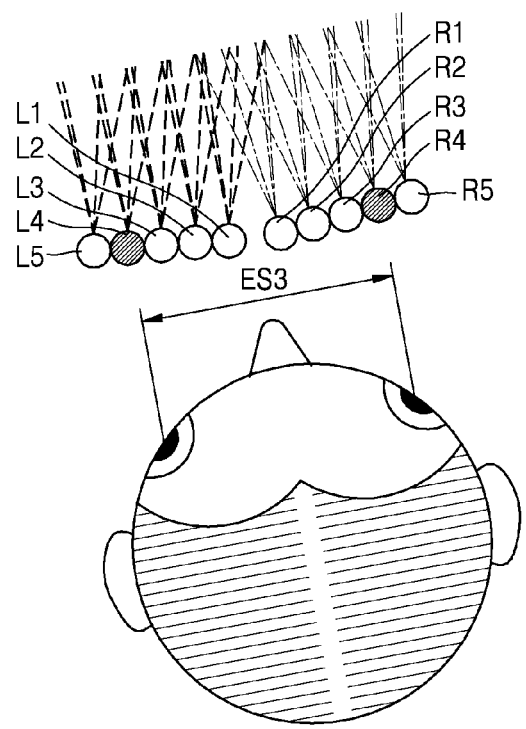

FIGS. 8A, 8B, and 8C are schematic diagrams which illustrates how a natural holographic image is perceived in spite of different binocular distances of users, according to an exemplary embodiment.

Generally, an average value of binocular distances of users is about 62 mm, and a hologram image perceived by the left eye and right eye of a user is provided based on the average value of the binocular distance. However, the binocular distance slightly varies from one individual to another, and thus, if the binocular distance of a user deviates from the average value, a hologram image formed based on the average value of the binocular value may be perceived unnaturally by the user. To solve this problem, high definition eye tracking may be required.

However, in the exemplary embodiment, as the multiple identical holograms which are shifted with respect to one another by a predetermined distance and overlapped on one another, this problem of a hologram image being unnaturally perceived by a user may be lessened or eliminated.

As shown in FIGS. 8A, 8B and 8C, a plurality of image windows L1, L2, L3, L4 and L5 are continuously formed in the viewing window corresponding to the left eye of the user. The image windows L1, L2, L3, L4 and L5 display the same image. Also, a plurality of image windows R1, R2, R3, R4 and R5 are continuously formed in the viewing window corresponding to the right eye of the user. The image windows R1, R2, R3, R4 and R5 display the same image.

The user perceives one image from among images in the image windows L1, L2, L3, L4 and L5 and one image from among images in the image windows R1, R2, R3, R4 and R5 according to the pupil positions of the left eye and the right eye of the user.

When the binocular distance is ES1 as shown in FIG. 8A, the user perceives images in L4 and R3 image windows.

In a case in which the binocular distance is ES2 as shown in FIG. 8B, the user perceives images in L3 and R2 image windows.

In a case in which the binocular distance is ES3 as shown in FIG. 8C, the user perceives images L4 and R4 image windows.

According to an exemplary embodiment, a natural holographic 3D image may be perceived without further constituents in response to various binocular position and distance of the user.

Figure 9:
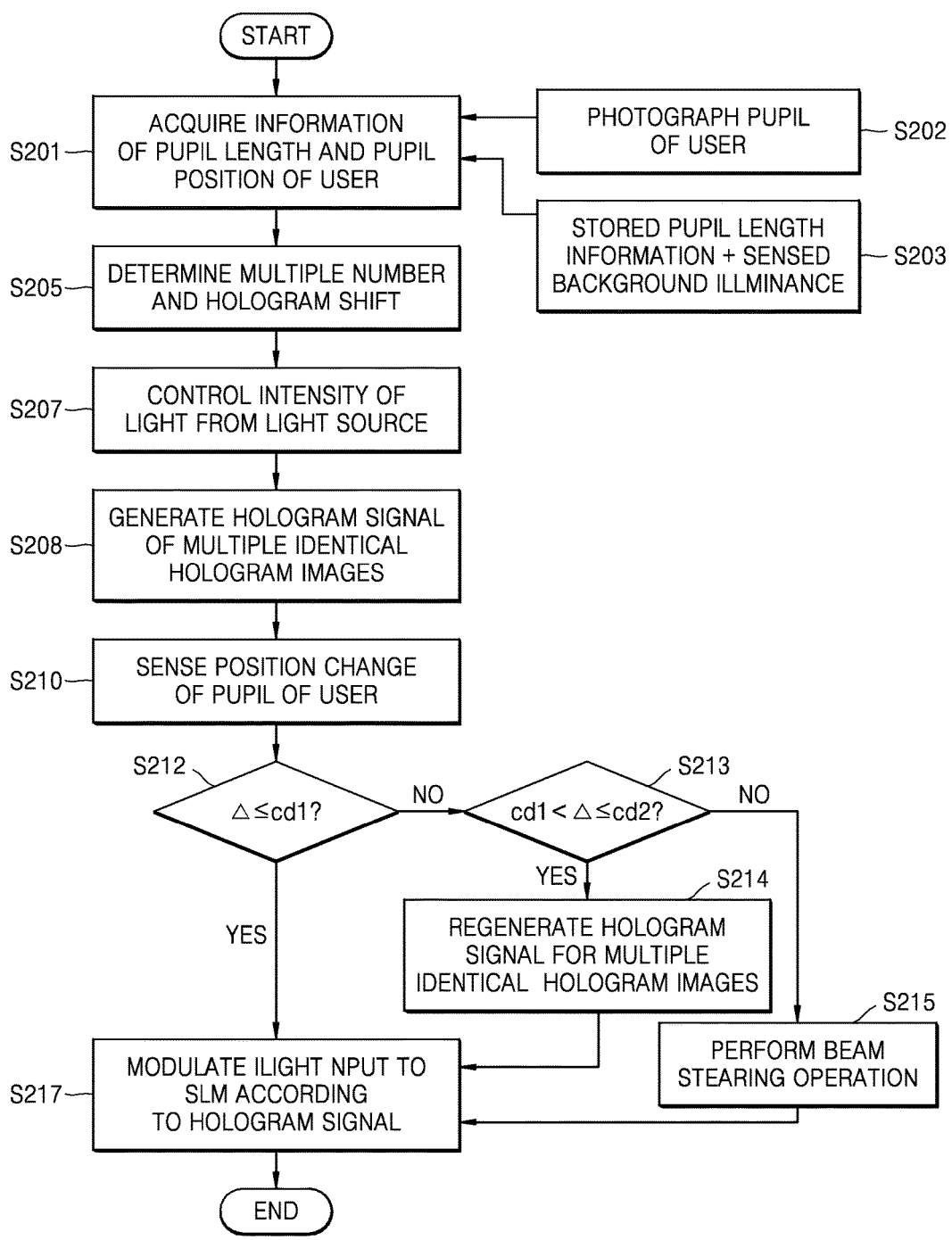
FIG. 9 is a flowchart of a method of displaying a holographic 3D image according to another exemplary embodiment.
Figure 10:
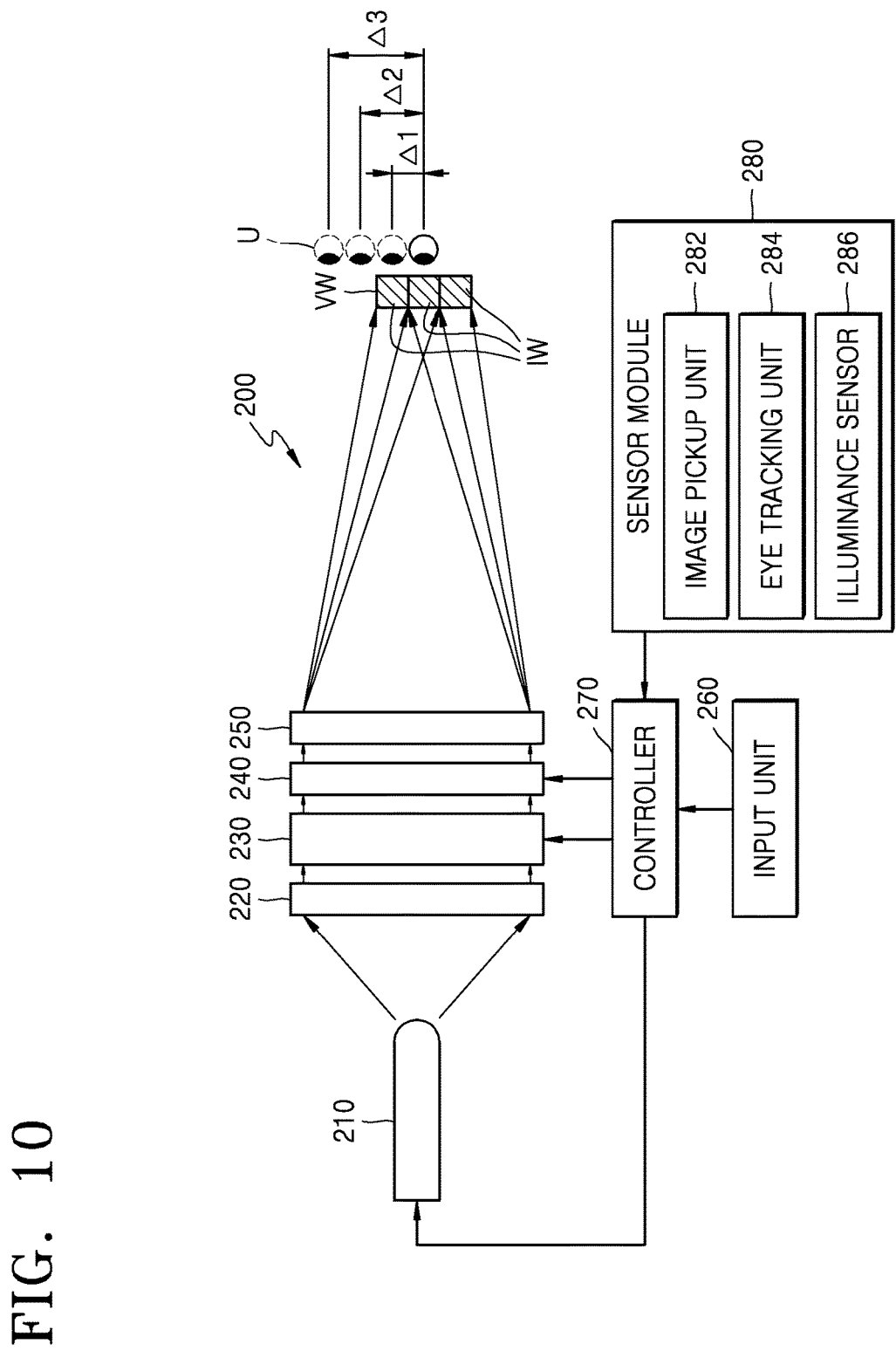
FIG. 10 schematically illustrates a configuration of a holographic 3D image display apparatus according to another exemplary embodiment.

FIG. 9 is a flowchart of a method of displaying a holographic 3D image according to another exemplary embodiment. FIG. 10 schematically illustrates a configuration of a holographic 3D image display apparatus according to another exemplary embodiment.

In the method of FIG. 9, a hologram signal for multiple identical hologram images, which are shifted with respect to one another by a predetermined distance and overlapped on one another, is generated, and reproduced via a spatial light modulator (SLM).

Hereinafter, the method is explained according to another exemplary embodiment.

For generating the hologram signal for the multiple identical hologram images, pupil length information and pupil position information of a user are acquired (S201). A method of photographing the pupil of the user may be used (S202). Specifically, a real-time method of photographing the pupil of the user who watches a holographic 3D image may be used. Alternatively, the pupil length information may be determined in advance and a result of sensing a background illuminance may be utilized (S203). For example, the pupil length information of the user may be obtained in advance by photographing the pupil of the user, or average pupil length information of many users may be stored as data. By using these pieces of information, a pupil length of the user in a certain background may be estimated by sensing the background illuminance.

Next, a number N of the multiple identical hologram images, and a distance between adjacent hologram images from among the multiple identical hologram images, that is, a hologram shift HS, are determined (S205). In operation S205, information input by the user with respect to the number N or the hologram shift HS may be received. For example, the user may select the number N according to his/her preference by considering a image quality of the holographic 3D image and power consumption. The hologram shift HS may be determined so that a pitch of reproduced hologram images is greater than or equal to the pupil length of the user. In this case, the information input by the user with respect to the pitch of the reproduced hologram images which is equal to or greater than the pupil length of the user, may be received.

Next, an intensity of light emitted by a light source is adjusted according to the determined number N (S207). As the number N increases, a brightness of respective hologram images may be lowered. As the number N increases, the intensity of the light may be adjusted to be high to obtain an adequate brightness of the hologram images. The operation S207 may be omitted.

Next, the hologram signal for multiple identical hologram images is generated (S208). A hologram value and a position of the multiple holograms on a surface of the SLM may be calculated based on depth information of object points constituting the holographic 3D image, the pupil position information of the user, the number N, and the determined hologram shift HS.

Also, sensing a change in the pupil position may be performed (S210).

A difference value Δ between a first pupil position and a second pupil position may be received. A controller may determine whether or not a new hologram signal corresponding to the second pupil position is to be generated based on the difference value Δ.

The determination may be performed by comparing the change value Δ with a reference value. For example, if the reference value is cd1, it is determined whether the difference value Δ is equal to or less than cd1 (i.e., Δ≤cd1) (S212). If Δ≤cd1, light input to the SLM is modulated according to the multiple image signals generated during operation S208. The reference value cd1 may be determined as a value equal to N×HS.

If the difference value Δ is greater than cd1 (i.e., Δ>cd1), it is determined whether the difference value Δ is equal to or less than cd2 (i.e., cd1<Δ≤cd2) in order to decide whether to regenerate a hologram signal for multiple identical hologram images corresponding to the changed pupil position or to re-direct the light modulated by the SLM toward the changed pupil position (S213). A value of cd2 may be a maximum value of the change of the pupil position which may be handled only by regenerating the hologram signal.

If cd1<Δ≤cd2, a hologram signal for multiple identical hologram images corresponding to the changed pupil position is regenerated (S214), and light input to the SLM is modulated according the regenerated hologram signal (S217).

If the difference value Δ is greater than cd2 (i.e., Δ>cd2), a beam steering operation is performed to control the reproduced image toward the pupil of the user (S215). For the beam steering operation, a beam steering device may be used. Modulating the light input to the SLM according to the hologram signal (S217) and the beam steering operation S215 may be simultaneously performed if Δ is greater than cd2. In other words, a direction of the reproduced image from the SLM is controlled to be toward the changed position of the pupil of the user.

FIG. 10 shows an exemplary holographic 3D image display apparatus that performs the method of FIG. 9.

The holographic 3D image display apparatus 200 includes a light source 210, a collimator 220, a spatial light modulator (SLM) 230, a beam steering device 240, and a field lens 250.

The light source 210, the collimator 220, the SLM 230, and the field lens 250 are substantially same as the light source 110, the collimator 120, the SLM 130, and the field lens 150 illustrated in and explained with regard to FIG. 1. Thus, detailed descriptions thereof are omitted.

The beam steering device 240 is an optical device for directing a light modulated by the SLM 230 toward a pupil of a user. The beam steering device 240 may change a direction of input light toward a predetermined direction according to an input signal, for example, an electric signal. The beam steering device 240 may include an active optical prism or a liquid crystal grating.

The arrangement order of the beam steering device 240 and the field lens 250 may be changed.

The holographic 3D image display apparatus 200 may further include a controller 270, an input unit 260, and a sensor module 280.

The sensor module 280 may include an image pickup unit 282, an eye tracking unit 284, and an illuminance sensor 286.

The image pickup unit 282 may photographing a pupil length and a pupil position. Information acquired by the image pickup unit 282 is transmitted to the eye tracking unit 284, and eye tracking software may operate according to this information.

The illuminance sensor 286 may measure an illuminance level of a background in which the user U is positioned. If information of the pupil length of the user is pre-stored, the controller 270 may change the pupil length according to the illuminance level. In other words, the illuminance sensor 286 may transmit information of the illuminance level to the controller 270, and the controller 270 may estimate the pupil length based on the pre-stored information and the illumination information.

The controller 270 may perform a calculation for generating a hologram signal for multiple identical hologram images, and may control the SLM 230 according to the hologram signal. Also, the controller 270 may adjust an intensity of light emitted by the source 210 according to a number of the multiple identical hologram images, and control the beam steering device 240 according to the received eye tracking information from the sensor module 280.

The controller 270 may execute a program code for performing the above described operations according to an installed operation system, and may operate to generate and use data. The operation system is generally well-known, and may be for example, Window OS, Unix, Linux, Palm OS, DOS, Android, and Macintosh.

The controller 270 may be implemented as a single chip, a plurality of chips or a plurality of electric devices. For example, the controller 270 may have various architectures including an exclusive or embedded processor, a single purpose processor, and application-specific integrated circuit (ASIC), etc.

The input unit 260 may receive information from the user for driving the controller 270, and transmit the information to the controller 270. The input unit 260 may include a button, a key pad, a switch, a dial, and a touch interface for the user to directly operate the controller 270. The input unit 260 may include a display displaying a required image for operating the controller 270, and may be implemented as a touch screen. Also, the input unit 260 may include an I/O port connection with a human interface device (HID) or for inputting/outputting an image.

The holographic 3D image display apparatus 200 may form a plurality of image windows IWs including the same image in a viewing window VW. When a pupil position change Δ1 sensed by the eye tracking unit 284 is less than cd1 (=N×HS) as described above, the user perceives the same holographic 3D image. A precision rate of the eye tracking unit 284 or the image pickup unit 282 may be set to be larger than the value of cd1, and a burden for the precision rate of the eye tracking unit 284 or the image pickup unit 282 may be reduced.

When the pupil position change Δ2 sensed by the eye tracking unit 284 is in a range in which the hologram signal for multiple identical hologram images is regenerated, the controller 270 may regenerate the hologram signal to form the hologram images at corresponding positions.

When the pupil position change Δ3 sensed by the eye tracking unit 284 is in a range in which the beam steering is required, the controller 270 may operate the beam steering device 240 to direct light formed in the SLM 230 toward the changed pupil position of the user.

As described above, according to one or more exemplary embodiments, a plurality of image windows may be formed in a viewing window, and thus, although a position of a user's pupil may change within a predetermined range, a holographic 3D image may still be perceived by the user without activating multiple light sources differently.

Also, if an eye tracking method is used, the holographic 3D image may still be perceived by the user even though a change in a pupil position is large. Also, a relatively low precision eye tracking method may be used.

The apparatuses and methods for displaying holographic 3D image according to one or more exemplary embodiments may be applied to various electronic devices, for example, a monitor, a TV set, a mobile display, a mobile telecommunication device, etc.

It should be understood that the exemplary embodiments described herein should be considered in a descriptive sense only and not for purposes of limitation. Descriptions of features or aspects within each embodiment should typically be considered as available for other similar features in other embodiments.

In addition, methods of displaying holographic 3D image according to one or more exemplary embodiments can also be implemented through computer readable code/instructions recorded in/on a medium, e.g., a computer readable medium, to control at least one processing element to implement any of the above described embodiments. The medium can correspond to any medium/media permitting the storage and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure capable of including or carrying a signal or information, such as a device carrying a bitstream according to exemplary embodiments. The media may also be a distributed network, so that the computer readable code is stored/transferred and executed in a distributed fashion. Furthermore, the processing element may include a processor or a computer processor, and processing elements may be distributed and/or included in a single device.

While the apparatuses and the methods for displaying holographic 3D image according to the exemplary embodiments have been described with reference to the enclosed figures, it will be understood by those of ordinary skill in the art that various changes in form and details may be made therein without departing from the spirit and scope of the present inventive concept as defined by the following claims.

What is claimed is:

1. A method of displaying a holographic three-dimensional (3D) image, the method comprising:
    generating a non-transitory hologram signal to generate multiple identical hologram images which are shifted with respect to one another by a predetermined distance and overlapped on one another, in a viewing window comprising a plurality of image windows, each of the multiple identical hologram images occupying a corresponding one of the plurality of image windows which are continuously disposed in the viewing window, wherein a length of the image window is substantially the same as a pupil length of a user, and a spacing between the plurality of image windows is less than the pupil length of the user; and
    modulating, by a spatially light modulator (SLM), a light that is emitted from a light source and is incident on the SLM based on the non-transitory hologram signal,
    wherein the plurality of image windows are simultaneously formed in the viewing window and shifted with respect to one another via the SLM without a mechanical movement of the light source.

2. The method of claim 1, wherein the generating the non-transitory hologram signal comprises:
    determining a number of the multiple identical hologram images; and
    determining the predetermined distance.

3. The method of claim 2, wherein the determining the predetermined distance comprises determining the predetermined distance to set a pitch of the multiple identical hologram images to be greater than or equal to the pupil length of the user.

4. The method of claim 3, wherein the determining the predetermined distance comprises photographing the pupil length of the user.

5. The method of claim 3, wherein the determining the predetermined distance comprises determining the predetermined distance based on the pupil length of the user stored in advance and a background illuminance level.

6. The method of claim 1, further comprising increasing an intensity of the light incident on the SLM as a number of the multiple identical hologram images increases.

7. The method of claim 2, wherein the determining the number comprises determining the number of the multiple identical hologram images based on a signal input by the user.

8. The method of claim 1, further comprising tracking a left pupil position and a right pupil position of the user,
    wherein the modulating comprises modulating the light incident on the SLM based on a binocular distance between a first pupil position and a second pupil position.

9. The method of claim 1, further comprising:
    determining a value of a position change of a pupil of the user; and
    determining whether to regenerate a new non-transitory hologram signal for the multiple identical hologram images corresponding to the value of the position change of the pupil.

10. The method of claim 9, wherein the modulating further comprises modulating the light incident on the SLM based on the non-transitory hologram signal without regenerating the new non-transitory hologram signal in response to the value of the position change of the pupil being less than or equal to N×HS, where N is a number of the multiple identical hologram images, and HS is the predetermined distance.

11. The method of claim 9, wherein in response to the value of the position change of the pupil being larger than N×HS, where N is a number of the multiple identical hologram images, and HS is the predetermined distance, the new non-transitory hologram signal for the multiple identical hologram images corresponding to the position change of the pupil is regenerated, or the light modulated by the SLM is directed toward a position of the pupil that corresponds to the value of the position change.

12. A holographic three-dimensional (3D) image display apparatus comprising:
    a light source that emits a light;
    a spatially light modulator (SLM) configured to modulate the light which is transmitted from the light source and incident on the SLM; and
    a controller configured to generate a non-transitory hologram signal to generate multiple identical hologram images which are shifted with respect to one another by a predetermined distance and are overlapped on one another, in a viewing window comprising a plurality of image windows, and control the SLM based on the non-transitory hologram signal,
    wherein each of the multiple identical hologram images occupies a corresponding one of the plurality of image windows which are continuously disposed in the viewing window,
    wherein a length of the image window is substantially the same as a pupil length of a user, and a spacing between the plurality of image windows is less than the pupil length of the user, and
    wherein the plurality of image windows are simultaneously formed in the viewing window and shifted with respect to one another via the SLM without a mechanical movement of the light source.

13. The holographic 3D image display apparatus of claim 12, further comprising an image pickup device configured to photograph a pupil of the user.

14. The holographic 3D image display apparatus of claim 12, further comprising an illuminance sensor configured to measure a background illuminance level,
    wherein the controller is further configured to determine the predetermined distance based on the pupil length of the user and the measured background illuminance level.

15. The holographic 3D image display apparatus of claim 12, further comprising an eye tracking unit configured to track a left pupil position and a right pupil position of the user, wherein the SLM is further configured to modulate the light incident on the SLM based on a binocular distance between a first pupil position and a second pupil position.

16. The holographic 3D image display apparatus of claim 12, further comprising a beam steering device configured to direct light which is modulated by the SLM and transmitted toward a pupil of the user.

17. The holographic 3D image display apparatus of claim 16, wherein the beam steering device comprises an active optical prism or a liquid crystal grating.

18. The holographic 3D image display apparatus of claim 12, further comprising an input device configured to receive from the user a number of the multiple identical hologram images and transmit the number of the multiple identical hologram images to the controller.

19. The holographic 3D image display apparatus of claim 18, wherein the controller controls an intensity of the light transmitted from the light source in direct proportion to the number of the multiple identical hologram images.

20. An electronic device comprising the holographic 3D image display apparatus of claim 12.

21. An image display apparatus comprising:
a light source that emits a light;
a controller configured to generate a non-transitory hologram signal that includes a value of a hologram shift; and
a spatially light modulator (SLM) configured to modulate the light to generate, based on the non-transitory hologram signal, a plurality of hologram patterns in a viewing window comprising a plurality of image windows, the plurality of hologram pattern including a first hologram pattern placed at a first position and a second hologram pattern placed at a second position,
wherein each of the plurality of hologram patterns occupies a corresponding one of the plurality of image windows which are continuously disposed in the viewing window,
wherein the second position is spaced apart from the first position by the value of the hologram shift and the plurality of hologram patterns represent an identical image,
wherein the controller sets the hologram shift to correspond to a pupil length of a user,
wherein a length of the image window is substantially the same as the pupil length of the user, and a spacing between the plurality of image windows is less than the pupil length of the user, and
wherein the plurality of image windows are simultaneously formed in the viewing window and shifted with respect to one another via the SLM without a mechanical movement of the light source.

* * * * *